United States Patent Office 2,849,496
Patented Aug. 26, 1958

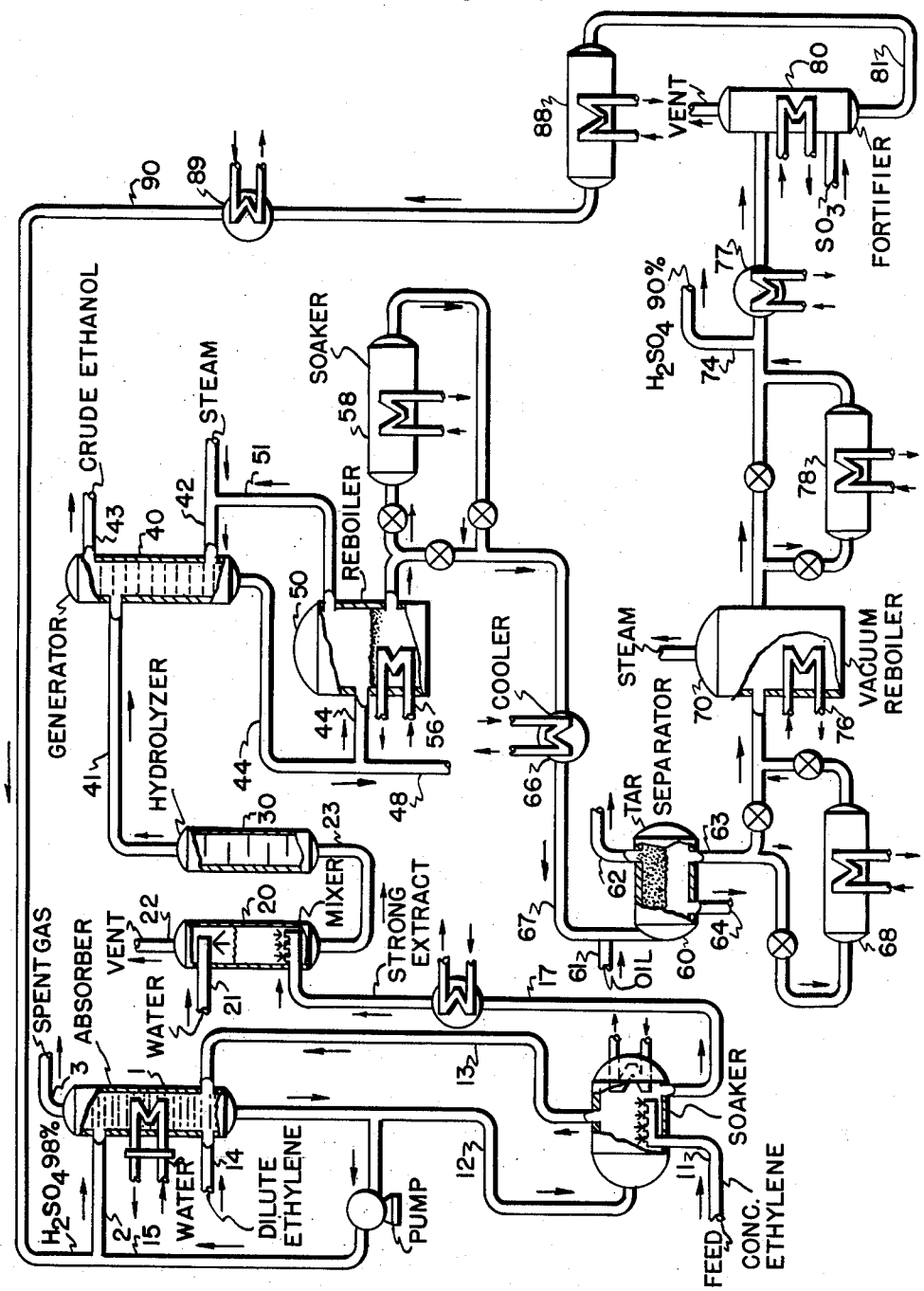

2,849,496

TREATMENT FOR REDUCTION OF FOAMING CHARACTERISTICS OF CONTAMINATED SULFURIC ACID IN ETHANOL PRODUCTION

Thomas H. Hakala, Union, and Walter R. F. Guyer, Short Hills, N. J., assignors to Esso Research and Engineering Company, a corporation of Delaware Application September 28, 1954, Serial No. 458,751

3 Claims. (Cl. 260—639)

This invention relates to a heat treating process for reducing the foaming tendency of contaminated sulfuric acid, particularly sulfuric acid recovered as ethanol generator bottoms in the stripping of ethanol from hydrolyzed ethylene-sulfuric acid extracts.

The manufacture of alcohols such as ethanol, isopropanol or secondary butanol from the corresponding olefins with the aid of strong sulfuric acid is well-known. For instance, in the case of ethanol manufacture the main steps usually include absorption of ethylene in about 95 to 99% sulfuric acid; dilution of the resulting extract with water to an acid strength of about 45 to 50%; hydrolysis; steam stripping the ethanol from the dilute acid; concentrating the dilute acid to about 65 to 75% strength in atmospheric reboilers; washing the acid with oil to remove tar and sludge; further concentrating the acid to about 90% strength in vacuum concentrators; and fortifying the acid back to its original strength with sulfur trioxide for subsequent recycling to the ethylene absorption stage of the ethanol plant.

However, one of the persistent difficulties in such alcohol processes has been the frequently excessive foaming of the acid in the olefin absorber and particularly in the reboilers, causing poor heat transfer, great loss of reboiler capacity, and consequently incomplete reconcentration of the acid and a general impairment of the entire operation.

It appears that such foaming difficulties are due largely to surface active carbon-containing compounds. These materials are formed as by-products in the process and, despite some removal thereof in the oil washing stage, tend to concentrate in the sulfuric acid as the latter is recycled in the process. Expressed as percent carbon based on 100% sulfuric acid, these foam producing impurities in the acid stream may typically amount to about 0.3% in the acid stream being fed into the absorber; due to side reactions taking place in the process the concentration of these impurities may increase to about 1% in the steam-stripped dilute acid going from the alcohol generator to the atmospheric reboilers; and, due to sludge deposition and steam distillation of organic matter, the concentration of impurities may drop down again to about 0.5% in the intermediate strength acid leaving the atmospheric reboilers. The undesirable impurities are undoubtedly formed mainly as a result of the oxidizing action of the strong acid in the absorption step, followed by complex condensation and sulfonation reactions. Of course, it will be understood that the present invention is not limited by any hypothesis regarding the formation of these foam producing impurities.

Patent 2,302,825 has previously proposed to heat black, carbon-contaminated sulfuric acid of 98% strength to high temperatures, in excess of 315° C., for the purpose of oxidizing the carbonaceous contaminants so as to convert the acid into a water-white product comparable to fresh acid. While this treatment appears to be successful in achieving an essentially complete destruction of the carbonaceous contaminants, the heating required is quite severe and economically rather burdensome, since the treated acid must be cooled again to less than 100° C. before it can be returned to the ethylene absorption step. Other processes have also been proposed wherein extensive destruction of the carbonaceous contaminants is obtained by oxidizing the spent acid with the acid of nitric acid, hydrogen peroxide or by air blowing under oxidizing conditions. These decarbonization processes, likewise, have not proved especially attractive in conjunction with highly competitive processes such as ethanol manufacture.

It is the general object of the present invention to provide an economical process for eliminating undue acid foaming in alcohol synthesis operations using strong sulfuric acid as a hydration agent. A more particular object is to prevent erratic operation of the acid reboilers in the manufacture of ethanol and to maintain the evaporative capacity of such reboilers at a high level. Still another object is to reduce the foaming tendency of spent acid withdrawn from such a process so as to make it suitable for recycling.

In accordance with these objects it has now been discovered that, contrary to prior concepts, extensive decarbonization of the spent acid is not essential for the purpose of eliminating its objectionable foaming tendencies, if certain critical conditions are observed. On the contrary, it has been discovered that comparatively mild heat soaking of the acid at temperatures of about 120 to 280° C., and under sufficient pressure to prevent boiling, is surprisingly effective in reducing the foaming characteristics of the acid, even without greatly reducing its carbon content, provided that the treatment is applied to an acid of at least 65% strength, but preferably to an acid of 90% strength or stronger. At temperatures substantially below 120° C. heat soaking actually may tend to aggravate foaming, except where the soaking temperature is maintained over impractically long periods of time.

The soaking time may range from about 0.5 to 15 or more hours, preferably about 0.5 to 3 hours, depending on the concentration and contamination of the acid as well as on treating temperature. Thus, the stronger the acid, the shorter is the soaking time required at any given temperature to effect the same degree of improvement; and the higher the soaking temperature, the shorter is the soaking time required for the same degree of improvment at any given acid concentration. For example, it has been found particularly convenient to heat soak 98 to 99% acid at about 150 to 175° C. for about 2 to 3 hours, or for shorter times at higher temperatures; or to heat soak 90 to 91% acid at 175 to 230° C. for about 3 to 6 hours; or to heat soak 65 to 70% acid for 10 to 24 hours at 150 to 160° C. at atmospheric pressure, or for shorter times at higher temperatures provided that sufficiently high pressure is applied to prevent boiling. Boiling in the soaker, particularly in the case of the more dilute acids, would tend to cause unwanted foaming. The soaking is usually effected in the absence of oxygen since the vapors evolved will normally displace any oxygen present.

While normally it is best to heat soak the entire acid stream at a given stage of the process, sometimes it may be sufficient to heat soak only a portion of the acid, and sometimes it may also be desirable to treat the acid under different conditions of temperature and concentration by heat soaking at more than one stage of the process.

As a result of previous contact with organic materials in the alcohol process the acids to be treated normally may contain carbonaceous impurities in an amount equivalent to about 0.1 to 2% carbon, usually about 0.2 to 0.8%.

As a result of the presently proposed treatment such acids can be made substantially non-foaming even when diluted, equivalent in effect to fresh white acid without the disadvantage of being corrosive as is the case with white acid. The treated acid is therefore eminently suitable for recycling to the ethylene absorber, although the treatment may have removed as little as 4% and not necessarily more than 70% of the carbon originally present. In other words, the non-foaming acid of the present invention still may be jet black and may contain as much as 0.1 or even 0.3% total carbon. It appears that although such carbon is not destroyed in the process, it is converted to an essentially non-foaming form.

The operation and advantages of the invention, as well as its general nature and scope, will become more clearly apparent from the subsequent description, especially when read with reference to the attached drawing. In reading the present description it should be noted that all ratios and percentages of materials are expressed on a weight basis unless otherwise indicated. Acid strengths are given as weight percent $H_2SO_4$ in the aqueous solution.

The drawing represents a flow diagram of an ethanol plant embodying the present invention.

Referring to the drawing the invention will be illustrated in terms of a specific manufacturing operation employing hydration of ethylene with the aid of strong sulfuric acid. In this process concentrated ethylene gas feed is introduced into soaker 10 through line 11. This ethylene feed may be pure ethylene, but in commercial practice it will usually be a $C_2$ hydrocarbon fraction containing about 40 to 70 mole percent ethylene, the balance being mostly ethane accompanied by a small amount of up to about 5 mole percent of methane and a trace of up to about 0.5 mole percent of $C_3$ and higher hydrocarbons. Thus, for instance, the ethylene feed may contain about 3.2% $CH_4$; 65.7% $C_2H_4$; 31.1% $C_2H_6$; and less than 0.02% $C_3$ and higher hydrocarbons. In soaker 10 this concentrated ethylene feed is intimately contacted with the ethyl sulfate extract which is introduced into soaker 10 from primary absorption tower 1 through line 12. In this manner a part of the ethylene from feed stream 11 is absorbed in the extract in soaker 10 and the unabsorbed gas, which still may contain about 40 to 50 mole percent of ethylene, is then passed through line 13 into plate tower 1 where the ethylene absorption is substantially completed by contact with sulfuric acid. In addition a relatively dilute ethylene gas such as an extraneous refinery gas stream containing about 30 to 50 mole percent ethylene may also be introduced into tower 1 through line 14.

Sulfuric acid of at least about 90% strength (ethylene-free basis), e. g. 98% acid is introduced into the top of tower 1 via line 2 so that the acid passes countercurrently to the rising gas from which the ethylene is to be extracted. Spent gas is withdrawn from the top of tower 1 via line 3 and may be used as fuel, while the resulting ethylene extract is removed at the bottom via line 12 to be further fortified in soaker 10 as previously described. Furthermore, it is desirable to recycle some of the extract from absorber 1 via line 15 to the acid inlet 2. The amount of such recycle to fresh acid is preferably such as to produce a feed acid mixture having a saturation of about 0.5, that is, containing about 0.5 mole of ethylene per mole of $H_2SO_4$. Such a mixture is greatly superior to straight sulfuric acid as an absorbent.

The extraction in absorption vessels 1 and 10 may be carried out at temperatures of about 60 to 100° C., e. g. 75° C., and at a pressure of about 100 to 500 p. s. i. g., e. g. 300 p. s. i. g. Heat of absorption may be removed from the absorption vessels in any convenient manner, e. g. with the aid of internal cooling coils 6 and 16 through which a coolant such as water may be circulated. The mole ratio of concentrated acid (calculated as 100% $H_2SO_4$) in feed line 2 to total ethylene feed (calculated as 100% $C_2H_4$) in lines 11 and 14 may range between about 0.6/1 to 0.9/1.

The resulting ethyl sulfate extract is passed from soaker 10 to mixer-hydrolyzer 20 via line 17 and may contain about 45.5% of diethyl sulfate, 38% ethyl hydrogen sulfate and 16.5% free sulfuric acid; it may have a saturation of about 1.2 to 1.5, e. g. 1.3. In mixer 20 the extract is mixed with enough water or dilute sulfuric acid to permit substantially complete hydrolysis of the ethyl sulfate extract into ethanol, ether, and acid. In customary practice this involves the addition of enough water through line 21 to reduce the acid strength to about 50% or less, e. g. to 48% on an ethylene-free basis. Any gas such as physically dissolved feed gases which may be evolved in mixer 20 may be vented via line 22. The mixture is then usually brought to equilibrium by soaking in a separate hydrolyzer 30 at a temperature of about 70 to 120° C. for a suitable period of time, e. g. about three hours at 100° C. or appropriately longer times at lower temperatures. After reaching equilibrium the mixture will contain essentially no diethyl sulfate.

The equilibrated aqueous extract is fed from hydrolyzer 20 to one or more generator towers 40 through line 41. Steam is also introduced into generator 40 through line 42 for the purpose of stripping liberated alcohol from the mixture and substantially completing the hydrolysis of any monoethyl sulfate present. With an acid strength of about 48% and at atmospheric pressure, the bottom plates of generator 40 may be operated at about 120° C. while keeping the top plate at about 90° C. Lower temperatures may be employed if the step is done under vacuum. The hydrolysis in generator 40 will normally be completed in about 0.5 to 5 minutes, e. g. in about 2 minutes. The amount of stripping steam is dictated primarily by the heat balance, enough steam being added to strip out essentially all of the ethanol produced and to raise the acid in the tower to its boiling point. The stripped out crude alcohol vapors which may contain about 50 mole percent of water are finally withdrawn from tower 40 via line 43 and recovered in a conventional manner which need not be described here in detail. For instance, the alcohol vapors may be scrubbed with caustic soda, condensed, passed through a first distillation column to remove ether, and finally rectified in an alcohol column.

The stripped dilute acid at 48% strength is withdrawn from generator tower 40 via line 44 and passed to one or more acid reboilers 50. At this stage the acid will contain about 0.8 to 1% of carbonaceous or carbon-containing impurities. These are the agents responsible for the harmful foaming normally encountered in the operation of the reboiler as the acid is concentrated by evaporation of water. The heat required for the reboiling step can be supplied in any convenient manner, e. g. by circulating diphenyl through heating coil 56. The steam produced in this operation may be used for stripping in generator 40, being passed thereto through line 51 and aforementioned line 42. Reboiler 50 is usually operated at atmospheric pressure and at a temperature of about 160° C., producing a dark colored acid of about 68% strength and a carbon content of about 0.4 to 0.5%. This acid, or at least a part thereof, is then usually cooled to about 40° C. in water cooler 66 and passed through line 67 to tar separator 60. There the acid is washed with a miner proportion of on inert, acid immiscible flotation agent such as gas oil admitted via line 61 which will float carbonaceous contaminants out of the acid. Other suitable wash liquids include kerosene, pine oil, and the like. About two volumes of wash oil per 100 parts of acid represent a suitable, though not by any means critical, ratio. As the mixture settles in separator 60, the oil layer which will contain a portion of the carbonaceous impurities may be withdrawn via line 62. The washed acid layer is noticeably lighter in color than the acid being fed into the tar separator, but still usually contains about 0.3 to 0.4% of carbon.

The washed acid is then passed through line 63 to one or more vacuum reboilers 70 where the acid is heated and concentrated to a strength of about 90 to 91% at temperatures of about 150 to 175° C. and a pressure of about 25 to 125 mm. Hg. Here, also, some foaming is likely to occur, but usually is not nearly so troublesome as in the atmospheric reboilers. Finally, the 90% acid from the vacuum reboiler 70 is cooled to about 20 to 40° C. in water cooler 77 and passed to one or more fortifying towers 80 where enough sulfur trioxide gas is added to bring the acid to the desired strength of about 98%. The resulting acid withdrawn via line 81 may then be recycled via line 2 to the absorption step. Also, since the addition of extraneous sulfur trioxide for fortification produces a net increase in sulfuric acid inventory, surplus acid must be withdrawn from the system. For instance, this excess acid may be withdrawn at 68% strength via line 64, after washing in separator 60. However, if desired, the excess sulfuric acid may be withdrawn in any other form, e. g. via line 48 as 48% acid after hydrolysis in generator 40, or via line 74 as 90% acid after vacuum concentration in reboiler 70.

The description given thus far has related essentially to a conventional process. The features characterizing the present invention will now be described in connection therewith. Specifically, it has been discovered that foaming in reboiler 50 can be eliminated or satisfactorily controlled if the spent acid, or at least a portion thereof, is properly heat treated before it is recycled to the absorption step. It is particularly advantageous to heat treat the 98% acid from fortifier 80 by passing it through soaker 88 where it is heated and kept at about 260° C. for two hours, whereby its objectionable foaming characteristics are destroyed. Thereafter it can be cooled in cooler 89 to the temperature of the absorption step and returned to the latter via lines 90 and 2. The described treatment of the 98% acid has several important advantages, which include the relative noncorrosiveness, small volume and high reactivity of this acid in comparison with more dilute acids. Nevertheless, the desired improvement can similarly be obtained by heat soaking a less concentrated acid stream at another stage of the process. In fact, such alternative treatments may have important advantages of their own. Thus, for instance, a satisfactory improvement in foaming characteristics can be obtained by passing the hot 91% acid from the vacuum reboiler 70 through soaking drum 78 where it may be kept for about five hours at atmospheric pressure and at essentially the same temperature as in reboiler 70, i. e. at 175° C. This heat soaking alternative requires comparatively little extra heat since it can make full use of the heat content of the acid coming from the vacuum reboiler whereas in the case of heat soaking the 98% acid as it comes from fortifier 80, the acid must be heated essentially from room temperature to the temperature of the soaking treat, whereupon much of the heat must again be removed before the acid is recycled to the absorber.

Still other feasible alternatives include heat soaking the 65 to 70% acid from the atmospheric reboilers, either before or after the oil wash. Accordingly, the hot acid from reboiler 50 can first be passed through soaker 58 or the washed acid from tar separator 60 can be passed through soaker 68. With the 65 to 70% acid it is particularly convenient to heat soak at the temperature at which the acid leaves the reboiler, e. g. at 165° C., allowing a sufficient residence time to cause the desired improvement. Higher soaking temperatures and correspondingly shorter residence times can also be used in this step, but usually it is then advisable to operate under pressure to prevent boiling of the relatively dilute acid. Thus, for instance, a pressure of 10 atmospheres will be sufficient to allow heating the 65% acid to about 235° C. without boiling.

Various tests were performed to illustrate the nature and effectiveness of the present invention, particularly its effect on acid foaming. In determining the foaming characteristics of the various acid samples the following apparatus and test procedure were used.

The test apparatus consists essentially of a glass test tube 16 inches high and 1⅞ inches outside diameter, the tube being provided with a 0.5-inch diameter side arm at a point 2⅝ inches from the top of the tube. The tube is closed at the top with a rubber stopper through which passes a narrow glass thermowell containing a thermocouple. The tube is graduated in 5 ml. increments to 500 ml. capacity, which capacity is reached at a point about 1¾ inches below the side arm. The tube is placed on a "Ful-Kontrol" electric heater which contains a variable transformer and a wattmeter in its circuit so as to permit exact control of heat input. The tube is shielded from drafts and air currents by a Transite chimney. To enhance reproducibility of results it is desirable to preheat the apparatus by distilling water for 15 minutes before carrying out the actual foaming tests. Of course, when a series of foaming tests is run in close sequence, such preheating is not required between consecutive tests. The preheated apparatus is charged with 100 ml. of test acid and three carborundum boiling chips of about 4 mesh. The chips aid in stabilizing the foaming tendency of the sample and prevent surging.

To make the foam test as closely representative of plant reboiler conditions as possible, the following procedure was used. The control or heat soaked test acid, as the case may be, was diluted to 68% $H_2SO_4$, refluxed one hour at its boiling point, that is, at 160° C., cooled, and diluted to 48% $H_2SO_4$. 100 ml. of this latter acid were used in the foam determination test. During the determination the heat input was kept constant at a value equivalent to 95 volts and 5.5 amperes. As a result, the 48% acid was concentrated from 120° to 170° C. liquid temperature by evaporation of water within a period of about 21 to 23 minutes. The foam height was recorded at 5° C. intervals as the distillation temperature rose from 120° to 170° C. In the case of a badly foaming sample the whole tube was filled with foam and there was no liquid level. In the case of good acids the actual foam height equalled the difference between the observed value and the volume of liquid not in the form of foam. In the case of a good acid this liquid volume originally was 100 ml. at 48% strength and was gradually reduced as water was evaporated while the acid was concentrated to 72% strength.

The following specific data demonstrate the effectiveness and advantages of this invention.

EXAMPLE I 91.2% black sulfuric acid taken from the vacuum reboiler of a commercial ethanol plant and the same acid after being fortified with sulfur trioxide to a strength of 98.5% $H_2SO_4$ were treated in accordance with the present invention. The foaming characteristics of the treated acids were then determined and compared with the untreated acids. The acid soaking was done in an open glass vessel by heating the acid from room temperature to the soaking temperature with mechanical agitation, maintaining the acid at the soaking temperature for a given period, and cooling to room temperature. The soaking temperature and period used in each run, as well as the foaming data obtained, are summarized in Table I.

Table I
EFFECT OF HEAT TREATMENT ON ACID FOAMING

| Run No | 1 | 2 | 3 | 4 | 5 | 6 |
|---|---|---|---|---|---|---|
| Acid concentration during heat treat, percent $H_2SO_4$ | 91.2 | 91.2 | 98.5 | 98.5 | 98.5 | 98.5 |
| Treating conditions: | | | | | | |
| Temp., °C | (1) | 270 | (1) | 190 | 270 | 320 |
| Time, hours | (2) | 2 | (2) | 2 | 2 | 2 |
| Foam test, at 48 percent $H_2SO_4$ initial concentration: | | | | | | |
| Max. observed foam level,[3] ml | 475 | 275 | 475 | 290 | 130 | 160 |
| Max. net foam volume,[4] ml | 375 | 175 | 375 | 190 | 30 | 60 |
| Observed foam level, ml. at 160° C | 385 | 120 | 400 | 210 | 95 | 110 |
| Net foam volume,[2] ml. at 160° C | 285 | 20 | 300 | 110 | −5 | 10 |
| Carbon: | | | | | | |
| Weight percent on total acid | 0.25 | 0.11 | 0.27 | 0.26 | 0.16 | 0.04 |
| Percent removal | | 56 | | 4 | 41 | 85 |

[1] Control.
[2] No treatment.
[3] Maximum foam height occurred at 125 to 135° C. in each case.
[4] Net foam volume equals total occupied volume in excess of original liquid volume.

The data show that, due to foaming, the volume of untreated acid samples of runs 1 and 3 can increase to almost five times their original liquid volume while being concentrated. It is obvious that such extensive foam formation would reduce the effective capacity of the reboilers to an intolerable extent. In contrast, all heat treated samples showed comparatively little foaming and consequently are well suited for recycling to the ethanol synthesis process. Furthermore, a comparison of runs 5 and 6 will show that while temperatures above 300° C. are indeed more effective in reducing the carbon content of the acid, this more extensive decarbonization shows no advantage in terms of reduced acid foaming. Acids giving a net foam test volume in excess of about 200 ml. at 160° C. (B. P. of 68% acid) represent extremely bad foam conditions and would be normally unsuited for concentration in atmospheric reboilers used in commercial alcohol plants. By contrast, acids giving a net foam test volume of less than 150 ml., and particularly those giving a foam height of not more than 40 ml. at 160° C. represent very mild foaming conditions and would be well suited for recycling to the ethylene adsorption plant.

EXAMPLE 2

The effect of soaking temperature and time on the foaming characteristics was further investigated in connection with another sample of a spent, fortified 98% $H_2SO_4$ acid taken from a commercial ethanol plant. This acid was heat treated for various periods at two different temperatures and its foam characteristics were then determined in the manner described earlier herein. The treating conditions and test results obtained are summarized in Table II.

Table II
EFFECT OF SOAKING TEMPERATURE AND TIME ON ACID FOAMING

| Run No | 7 | 8 | 9 | 10 | 11 | 12 | 13 | 14 |
|---|---|---|---|---|---|---|---|---|
| Treating conditions (98% acid): | | | | | | | | |
| Temp., °C | (1) | 78 | 78 | 78 | 150 | 150 | 150 | 150 |
| Time, hours | (2) | 5 | 7.5 | 24 | 1 | 3.5 | 5 | 7 |
| Foam test, at 48% $H_2SO_4$ initial concentration: | | | | | | | | |
| Max. observed foam level, ml | | 390 | 600 | 500 | 380 | 480 | 340 | 200 | 140 |
| Max. net foam volume, ml | | 290 | 500 | 400 | 280 | 380 | 240 | 100 | 40 |

[1] Control.
[2] No soak.

The data show that heat soaking at low temperatures such as 78° C. is without value with respect to foam reduction. Runs 8 and 9 demonstrate that mild soaking under these conditions can actually aggravate the foaming problem and that no significant improvement could be obtained except possibly after impractically long periods. Run 11 conducted at 150° C. also shows that insufficient heat soaking may actually aggravate foaming, apparently by formation of additional active foaming agents. However, these are rapidly broken down by further heating, provided that a sufficiently high temperature is used in accordance with the teaching of the present invention. It will be noted that heating the 98% acid for five hours at 150° C. reduces foaming to a satisfactory degree, and a seven-hour soak gives particularly good results.

EXAMPLE 3

This example shows the effectiveness of the invention as applied to a badly foaming 68% $H_2SO_4$ acid taken from the atmospheric reboiler of a commercial ethanol plant. This acid was heat treated for various lengths of time at two different temperatures by refluxing in glass equipment, and its foam characteristics were then determined in the same manner as described before. The acid foamed considerably, especially in the early stages of the refluxing operation. The treating conditions and test results obtained are summarized in Table III.

Table III
EFFECT OF HEAT TREATMENT ON FOAMING OF 68% ACID

| Run No | 15 | 16 | 17 | 18 | 19 | 20 | 21 |
|---|---|---|---|---|---|---|---|
| Treating conditions (68% acid): | | | | | | | |
| Liq. temp., °C | (1) | 165 | 165 | 165 | 170 | 170 | 170 |
| Time, hours | (2) | 6 | 23 | 33 | 2 | 10 | 14 |
| Foam test, at 48% $H_2SO_4$ initial concentration: | | | | | | | |
| Max. observed foam level, ml | 500 | 450 | 250 | 140 | 470 | 250 | 140 |
| Max. net foam volume, ml | 400 | 350 | 150 | 40 | 370 | 150 | 40 |

[1] Control.
[2] No soak.

The data again demonstrate the value of a proper heat soaking treatment in reducing the foaming characteristics of the acid. Even with the comparatively weak acid and at moderate temperatures effective reduction of foaming can be obtained by allowing a sufficient residence time. Comparison of runs 17 and 18 with runs 20 and 21 further illustrates the advantage of operating at the maximum temperature available. It will be observed that in the test cases shown, and for a given improvement in foaming characteristics, an increase in treating temperature from 165° C. to 170° C. permits reducing the soaking time by about one half. In practice, of course, it will be preferable to heat treat such relatively dilute acid at these temperatures under pressure, so as to avoid undesirable foaming which otherwise is apt to occur if the heat soaking is carried out above the boiling point of the acid.

Having described the general nature and specific embodiments and uses of the invention, its scope is particularly pointed out in the appended claims.

What is claimed is:

1. In an ethanol synthesis process wherein ethylene gas is absorbed in 95 to 99% sulfuric acid in an ethylene absorption zone, the resulting extract is hydrolyzed by aqueous dilution to an acid strength of about 45 to 50%, the crude ethanol is stripped from the hydrolyzed extract, the remaining black dilute acid of about 45 to 50% acid strength and containing carbonaceous impurities is reconcentrated to an intermediate level of about 65 to 70% $H_2SO_4$ by distilling off water in an atmospheric evaporation zone, the reconcentrated 65 to 70% acid is cooled and then washed with an inert, immiscible oil in a tar separation zone, the resulting carbon-containing oil layer is separated from the washed acid layer, the washed acid layer is further reconcentrated to at least 90% $H_2SO_4$ by distilling off water in a vacuum distillation zone at a pressure of 25 to 125 mm. Hg, the resulting reconcentrated 90+% acid is fortified to at least 95% $H_2SO_4$ by addition of sulfur trioxide thereto, and the fortified acid is recycled to the ethylene absorption zone; the improvement which comprises heat soaking the sulfuric acid after it has been reconcentrated to at least 90% $H_2SO_4$ at a temperature of 150° to 280° C. for a period of 1 to 15 hours and under a pressure sufficient to prevent boiling of the acid until the foaming characteristics of the acid have been sufficiently reduced, and then cooling the heat-soaked acid.

2. A process according to claim 1 wherein said heat soaking is performed upon said 90+% acid prior to the fortification with sulfur trioxide.

3. A process according to claim 1 wherein said heat soaking is performed upon said fortified acid subsequent to the fortification with sulfur trioxide.

References Cited in the file of this patent

UNITED STATES PATENTS

| | | |
|---|---|---|
| 2,065,617 | Sheldon | Dec. 29, 1936 |
| 2,067,985 | Sargent | Jan. 19, 1937 |
| 2,379,823 | Mottern | July 3, 1945 |
| 2,414,759 | Mottern | Jan. 21, 1947 |
| 2,418,210 | Wilde | Apr. 1, 1947 |
| 2,629,747 | Fuqua | Feb. 24, 1953 |
| 2,682,498 | Shmidl | June 29, 1954 |

FOREIGN PATENTS

| | | |
|---|---|---|
| 470,594 | Canada | Jan. 2, 1951 |